W. D. LUTZ.
ACCELERATING DEVICE FOR ALTERNATING CURRENT MOTORS.
APPLICATION FILED JAN. 7, 1911.

1,072,132. Patented Sept. 2, 1913.
2 SHEETS—SHEET 2.

UNITED STATES PATENT OFFICE.

WILLIAM D. LUTZ, OF ALLENDALE BOROUGH, NEW JERSEY, ASSIGNOR TO OTIS ELEVATOR COMPANY, OF JERSEY CITY, NEW JERSEY, A CORPORATION OF NEW JERSEY.

ACCELERATING DEVICE FOR ALTERNATING-CURRENT MOTORS.

1,072,132.      Specification of Letters Patent.      Patented Sept. 2, 1913.

Application filed January 7, 1911. Serial No. 601,427.

*To all whom it may concern:*

Be it known that I, WILLIAM D. LUTZ, a citizen of the United States, residing in the borough of Allendale, in the county of Bergen and State of New Jersey, have invented a new and useful Improvement in Accelerating Devices for Alternating - Current Motors, of which the following is a specification.

My invention relates to motor control and more particularly to the acceleration of an alternating current motor.

In accelerating a motor it is usually desired that the motor be brought up to full speed as rapidly as possible, and for different loads the acceleration should be in proportion to the speed of the motor instead of being dependent for operation upon a dashpot action or upon the passage of a certain interval of time. The magnetic effect of two transformer windings or of the windings of an induction coil may be so opposed that if the effect of one is varied the resultant current may be employed to energize a magnet or series of magnets.

The current taken by an alternating current motor is largest in starting, gradually decreasing as the motor accelerates, and at full speed the current taken is the minimum amount. In view of this characteristic, if the magnetizing effect of the motor current is opposed to the effect induced in another winding in such a way that when the motor is starting there is no resultant effect of the two, when the motor current decreases, the magnetic effect in the other winding becomes greater and may be utilized to energize a single device or several devices in succession.

The principal object of my invention is to utilize the above stated characteristic in providing means to accelerate a motor in proportion to the speed thereof regardless of the load on the motor.

Figure 1:
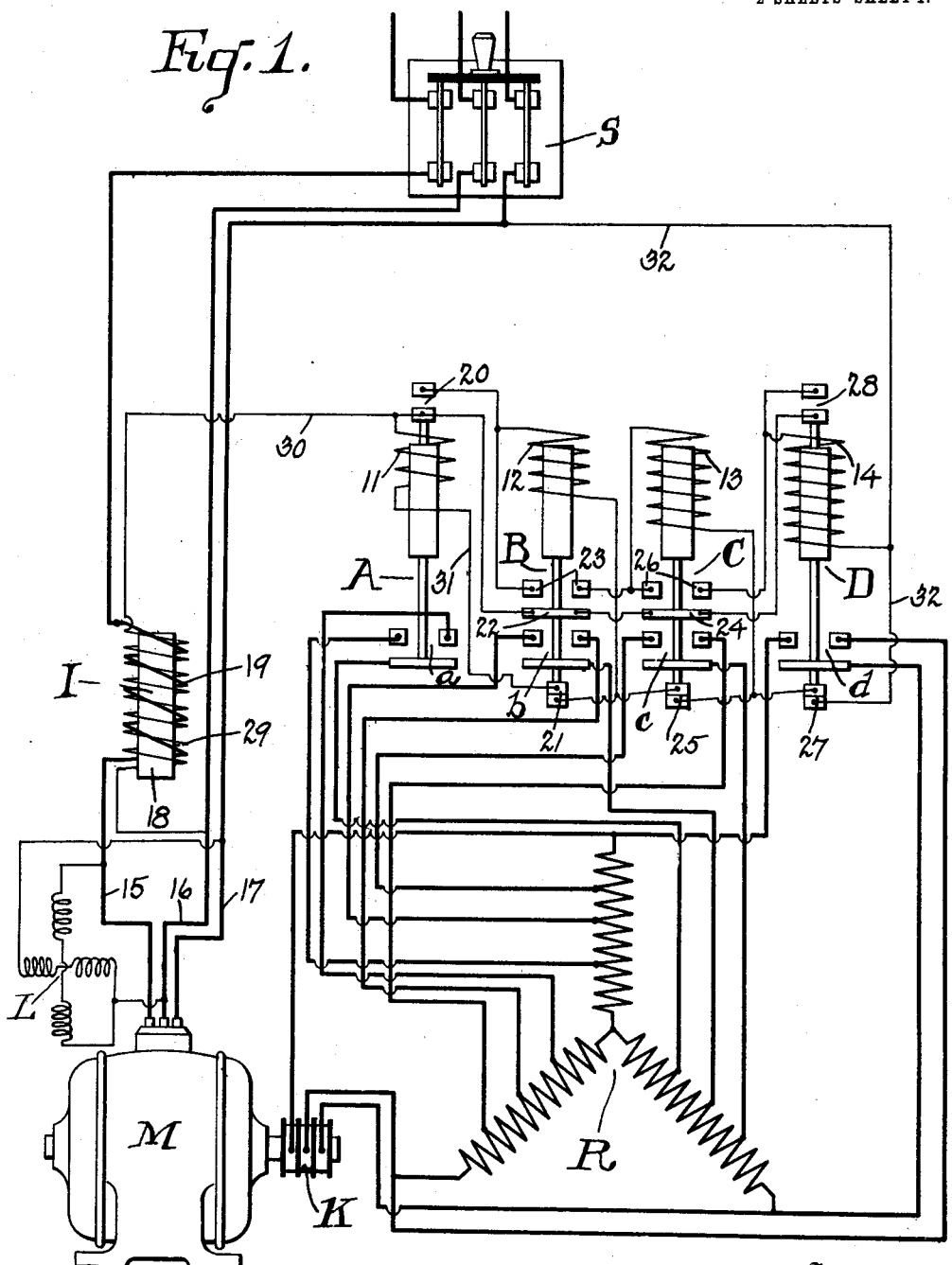
Figure 2:
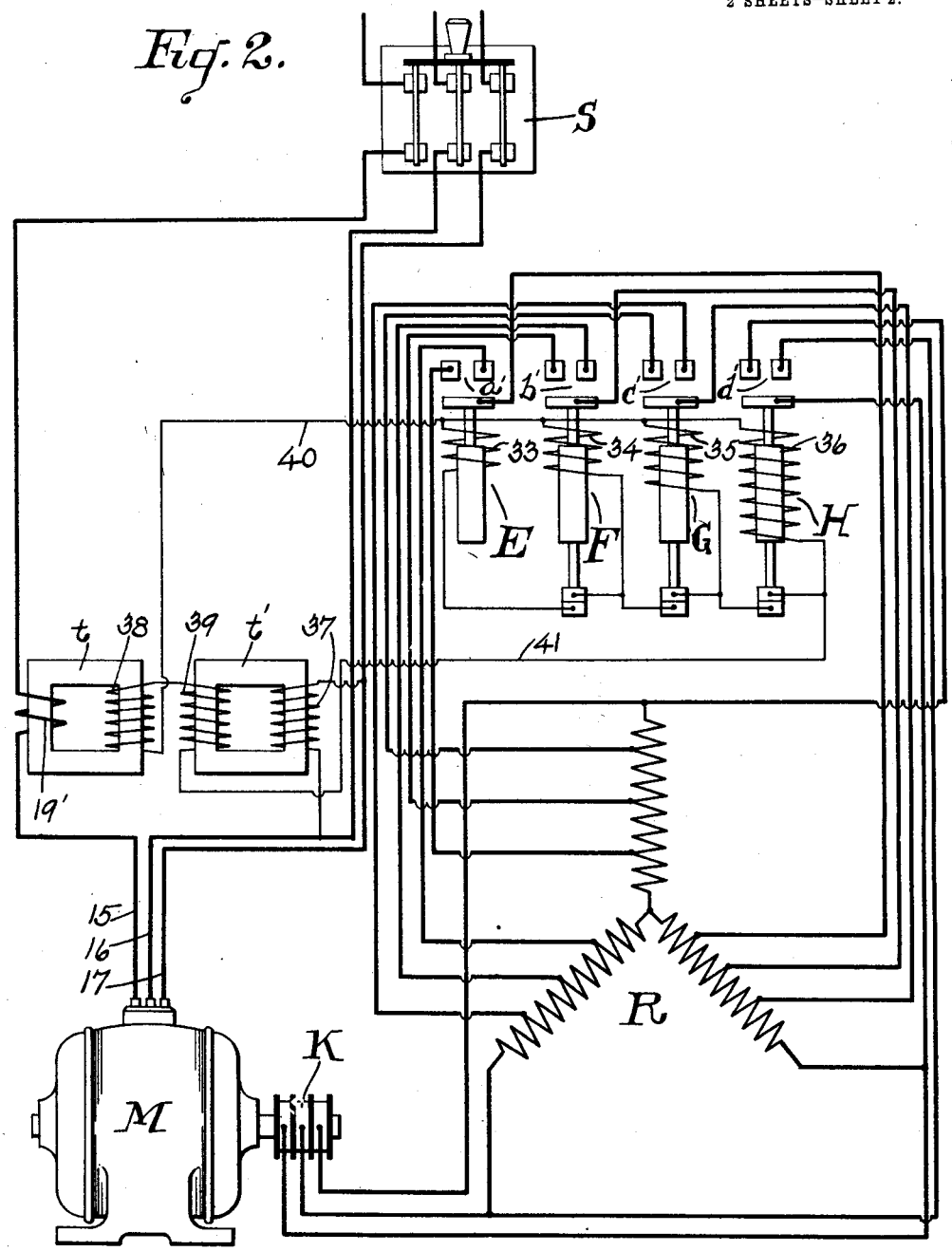

In the accompanying drawings, Figure 1 shows my invention in conjunction with a motor making use of an induction coil with opposed windings. Fig. 2 shows the same employing two transformers with opposed secondary windings.

Referring now more particularly to Fig. 1 a motor M is shown having slip rings K for the rotor winding, sectional starting resistance R, accelerating magnets, A, B, C, D, main switch S, inductive device I, and a brake device L connected to the motor mains. The motor M is connected to the main switch S by the motor leads 15, 16, 17, a few turns 19 of one lead, as 15, being wound around the core 18 of the inductive device I. The accelerating magnets operate groups of contacts $a$, $b$, $c$ and $d$ to short circuit portions of the resistance R which is connected to the rotor winding through the slip - rings K. The energizing circuits for the magnets are all completed through a winding 29 on the core 18. A circuit for the winding 11 is traced from the motor lead 16 through winding 29, conductor 30, winding 11, conductor 31, contacts 21, 25, 27, conductor 32 to motor lead 17. When the magnet A operates contacts 20 are joined and complete a circuit through the next magnet winding 12; the operation of magnet B separates the contacts 21 thereby opening the circuit of the magnet winding 11, connects the contacts 22, 23 to establish a circuit to the winding 13 of magnet C; magnet C in turn opens the winding circuit of magnet B and closes a circuit through magnet winding 14 of magnet D; magnet D when energized opens the magnet winding circuit of magnet C and establishes a holding circuit for its own energization through contacts 28. The winding 29 is first in series with winding 11 and both are connected across the motor leads 16 and 17. The winding 29, however, is wound about the core 18 so that when a current of sufficient strength flows in winding 19 it induces an electro-motive force of such a potential that the voltage applied to the terminals of winding 11 is not sufficient to actuate the magnet. As soon as the motor M starts, the current in the lead 15 is reduced, and the inductive effect of the winding 19 is less, thereby lessening the opposing electro - motive force in winding 29 and increasing the potential applied to winding 11 to such an extent that it is operatively energized. The operation of this magnet short-circuits a portion of the rotor starting resistance R and closes a circuit to the next magnet winding 12, resulting in acceleration of the motor M and a further decrease in current in the motor lead 15 and winding 19, and when this decrease reaches a predetermined value the next magnet is operated. In this way the acceleration of the motor may be accomplished step by step with as high a degree of refinement as desired.

In Fig. 2 the general arrangement is the same as shown by Fig. 1, the accelerating magnets, E, F, G and H having their windings 33, 34, 35 and 36 connected in parallel and receiving current from transformers $t$ and $t'$ by way of conductors 40 and 41. Of the two transformers $t$ and $t'$ the first has for its primary winding a number of turns 19' of the motor lead 15, and the second has a primary winding 37 connected across the motor mains 16 and 17. The secondary windings 38 and 39 are connected in series and in opposition, so that the magnet windings are subject only to the difference of potential induced in the two secondary windings. This difference varies because the electro-motive force induced in the windings 38 is directly proportional to the current in the winding 19', which decreases as the speed of the motor increases, while the induced electro-motive force in the winding 39 is always substantially the same. The magnet E is operatively energized first, then as the speed of the motor increases and the difference in potential between the two windings 38 and 39 increases, the next magnet F is operated, cutting off the magnet winding 33 by its operation. The contacts $a'$, $b'$, $c'$ and $d'$ are joined by the magnets in succession, to short-circuit portions of the accelerating resistance until it is all cut out and the motor runs at full speed.

It is obvious that various changes could be made in the arrangement and detail of parts herein set forth. For instance, the several inductive circuits could be connected to the various phases so as to compensate for any lag in inductive effect, this method being well known in alternating current practice.

I desire not to be limited to the precise arrangement and combination of parts herein described since it is obvious that those skilled in the art to which my invention appertains may make various changes without departing from the spirit and scope thereof.

What I claim and desire to secure by Letters Patent is:—

1. The combination with an alternating current motor, of an inductive winding in one of the motor leads, another inductive winding connected across two motor leads, receiving a potential equal to or proportional to that of the said leads, and opposing its effect to that of the first said winding, and inductive devices dependent for energization upon the difference in opposing effect.

2. The combination with an alternating current motor, of an inductive winding through which one motor lead is connected, another inductive winding connected across two motor leads and opposing its effect to the first winding, and magnets energized and successively operated by a current which flows when the opposing effect varies.

3. The combination with an alternating current motor, of an inductive winding connected to vary the inductive effect with the motor current, another inductive winding connected to the motor leads and having a substantially constant inductive effect, and means dependent for energization upon the difference in the inductive effects of the two windings.

4. The combination with an alternating current motor, of an inductive winding connected to vary the inductive effect in accordance with the current of the motor as the speed increases, another winding of substantially constant inductive effect opposed thereto, and electromagnets successively operated by current determined by the difference in inductive effect as the motor speed increases.

5. The combination with an alternating current motor of an inductive winding in one of the motor leads varying its inductive effect inversely as the speed of the motor varies, another winding connected across the motor leads with substantially constant inductive effect opposed to the first, and magnets dependent for energization upon the difference of inductive effect between the two windings.

6. The combination with an alternating current motor of an inductive winding in one of the motor leads varying its inductive effect inversely as the speed of the motor varies, another winding connected across the motor leads with substantially constant inductive effect opposed to the first, and magnets of different strength dependent for energization upon the difference of inductive effect between the two windings, this difference varying directly as the motor speed.

7. The combination with an alternating current motor of an inductive winding in one of the motor leads varying its inductive effect inversely as the speed of the motor varies, another inductive winding with inductive effect substantially equal to that of the first winding when the motor starts and exceeding it when the motor accelerates, and magnets dependent for energization directly upon the difference of inductive effects and energized in succession as the speed of the motor increases.

8. The combination of an alternating current motor, an accelerating resistance therefor, an inductive winding connected in a motor lead, the inductive effect decreasing as the motor speed increases, another inductive winding with substantially constant inductive effect to oppose the first winding, and magnets dependent for energization upon the difference of inductive effects and operative to short-circuit portions of the said resistance.

9. The combination of an alternating current motor, accelerating apparatus therefor, means to supply current to said apparatus independently of the motor, and inductive means governed by the current supplied to the motor to vary the current to said apparatus in response to variation in the current supplied to the motor.

10. The combination of an alternating current motor, accelerating magnets, and inductive means to differentially vary the current to the said magnets as the current to the motor varies.

11. The combination of an alternating current motor, accelerating magnets receiving current in a circuit separate from the motor, and inductive means to vary said current in response to variations in current through the motor.

12. The combination of an alternating current motor, electroresponsive accelerating mechanism, and an inductive device comprising a winding connected in circuit between the motor and source of current supply and a winding in the circuit of said electroresponsive mechanism.

13. The combination of an alternating current motor, starting resistance therefor, electromagnets controlling said resistance, a circuit for said magnets connected across two of the motor leads, and an inductive device comprising a coil in one of the motor leads and a coil in said magnet circuit.

In testimony whereof, I have signed my name to this specification in the presence of two subscribing witnesses.

WILLIAM D. LUTZ.

Witnesses:
 EDWARD H. STEELE,
 GEORGE D. ROSE.

Copies of this patent may be obtained for five cents each, by addressing the "Commissioner of Patents, Washington, D. C."